3,187,035
O-CHLOROALKYL O-ALKYLMERCAPTOALKYL AND O-CHLOROALKYL S-ALKYLMERCAPTO-ALKYL ESTERS OF ALKYL PHOSPHONIC ACIDS
Gerhard Schrader, Wuppertal-Kronenberg, Germany, assignor to Farbenfabriken Bayer Aktiengesellschaft, Leverkusen, Germany, a German corporation
No Drawing. Filed Jan. 30, 1962, Ser. No. 169,932
Claims priority, application Germany, Feb. 20, 1961, F 33,242
8 Claims. (Cl. 260—461)

The present invention relates to and has as its objects new and useful phosphonic acid derivatives and processes for the production thereof. Generally the new inventive compounds may be represented by the following formula

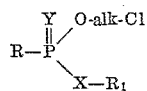

in which R stands for an optionally substituted preferably lower alkyl radical and alk denotes an alkylene radical optionally substituted, and wherein $R_1$ stands for an aliphatic, cycloaliphatic, araliphatic, aromatic or heterocyclic radical, which possibly may be substituted by convenient substituents, X and Y stand for oxygen or sulphur.

In accordance with the present invention it has been found that by reaction of the highly reactive alkyl-phosphonous acid-O-chloroalkyl ester mono-chlorides of the general formula

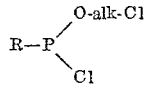

with optionally substituted alcohols, phenols or aliphatic, cycloaliphatic, aromatic or heterocyclic mercaptans in the presence of a suitable acid-binding agent there are obtained the hitherto unknown alkylphosphonous or alkyl-thiophosphonous acid-O-chloroalkyl-esters of the following constitution:

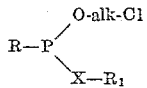

The last-mentioned derivatives of trivalent phosphorus can then themselves be converted according to methods known in principle by treatment with hydrogen peroxide, elementary sulphur or sulphur-yielding compounds into the corresponding alkyl-phosphonic or alkyl-thiophosphonic-O-chloroalkyl-acid esters of the general formula:

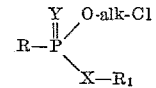

The inventive reaction may be explained in more detail by the following equation:

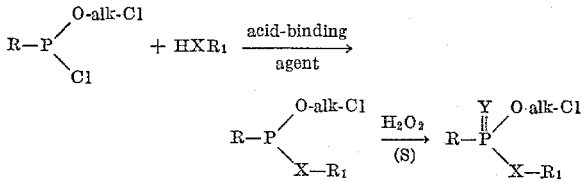

In the above formulae the symbols R, $R_1$, alk, X and Y have the same significance as given above.

When carrying out the reaction according to the invention is is not necessary to isolate the alkylphosphonous acid-O,O- or -O,S-diesters produced in the first stage of reaction in substance; instead the reaction products of alkylphosphonous acid-O-chloralkyl ester monochlorides with alcohols, phenols or mercaptans are with advantage immediately further reacted as a single operation with hydrogen peroxide or sulphur to give the corresponding phosphonic acid-O,O- or -O,S-diesters.

The alkylphosphonous acid-O-chloralkyl ester monochlorides can be produced by the reaction of alkylphosphonous acid dichlorides in suitable solvents and in the presence of acid-binding agents with alkylene oxides as it is already been known from the literature [cf. S. Z. Iwin, K. W. Karawanow, J. allgem. Chem. (Russ.), volume 29, page 3456 (1959)].

According to the data given by the aforesaid Russian authors the reaction of, for example, ethylene oxide with alkylphosphonous acid dichlorides leads to the successive exchange of the two chlorine atoms for the β-chloroethoxy radical, the following compounds thus being obtained:

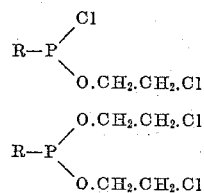

The alkylphosphonous acid-O-chloroalkyl ester chlorides required as starting materials for the process according to the invention can also be produced, in addition to the method already described, by reacting alkylene chlorohydrins with the said phosphonous acid derivatives.

By way of example of alkylphosphonous acid-O-chloroalkyl ester chlorides which can be employed according to the invention there may be mentioned the methyl-, ethyl-, n-propyl-, isopropyl-, n-butyl-, iso-butyl-, tert.-butyl-, amyl- or hexyl-phosphonous acid-O-chloroethyl-, -propyl- or -butyl-ester chlorides.

Moreover the new process can be applied to practically all alcohols, phenols or mercaptans. By way of alcohols use can be made, e.g. of hexanol, cyclohexanol, octyl- or dodecyl alcohol, the corresponding mercaptans as well as of lower aliphatic alcohols or mercaptans which may be optionally substituted by halogen atoms, cyano, amino, alkyl- or dialkylamino hydroxy, alkoxy, carbalkoxy, alkyl-mercapto groups and the like. As phenols or thiophenols, consideration can be given to, inter alia, (thio)-phenol, (thio)-cresols, chloro-(thio)-phenols, di- and tri-chloro-(thio)-phenols, alkyl-(thio)-phenols, alkyl-chloro-(thio)-phenols, alkoxy- or alkylmercapto-(thio)-phenols, alkoxy- or alkylmercapto-alkyl-(thio)-phenols or nitro-(thio)-phenols for the use as starting materials in the process according to the invention.

As already mentioned the inventive reaction of the alkyl phosphonous acid-O-chloroalkyl ester chlorides with the aforesaid alcohols, phenols or mercaptans preferably is carried out in the presence of acid binding agents; among these tertiary amines e.g. pyridine, triethylamine, or dimethylaniline have been found to be particularly useful.

Moreover in order to obtain especially good yields and pure products, it is expedient to carry out the reaction according to the invention at slightly elevated temperatures and, moreover, to afterheat the reaction products for some time in order to complete the reaction. Furthermore the use of inert solvents has proved to be advantageous. As solvents low-boiling hydrocarbons such as petroleum ether, ligroin, benzene or toluene have been found to be especially suitable.

In addition for the purpose of avoiding any interference by side reactions it is further advantageous to carry out the inventive reactions in an atmosphere of a protective gas (conducting a stream of an inert gas e.g. nitrogen or argon through the reaction mixture).

The phosphonic acid esters obtainable according to the present invention represent oily, in part water-soluble liquids which can be distilled under a high vacuum without decomposition. They are characterized by excellent insecticidal properties. The inventive compounds especially distinguish themselves by an outstanding contact insecticidal activity, against spider mites and aphids, but at the same time also against eating insects (e.g. caterpillars) and possess moreover an ovicidal and systemic activity.

Therefore, the compounds obtainable according to the process of the invention are intended to be used as pest control agents, chiefly for plant protection. The products are applied for this specified purpose in the manner customary for phosphorus-containing plant protectives or pest control agents, i.e. preferably in a concentration from about 0.00001% to about 1% and in combination with suitable solid or liquid extenders or diluents.

Examples of such solid carriers are talc, chalk, bentonite, clay and the like; as liquid carriers there may be mentioned water (if necessary with commercial emulsifiers), alcohols, especially lower alcohols such as methanol or ethanol, ketones, especially lower ketones such as acetone or methyl ethyl ketone, liquid hydrocarbons and the like. The new compounds may furthermore be used in combination with each other or with known insecticides, fertilizers etc.

As examples for the special utility the compounds of the following formula

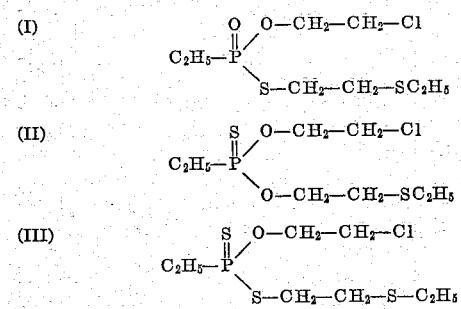

have been tested against aphids and spider mites. Aqueous dilutions of these compounds have been prepared by admixing them with the same amount of dimethyl formamide as an auxiliary solvent adding thereto 20% by weight referred to active ingredient of a commercial emulsifier consisting of a benzyl hydroxyl polyglycol ether containing about 10 to 15 glycol residues, and diluting at last this premixture with water to the desired concentration indicated in the following paragraphs:

The tests have been carried out as follows:

(a) Against aphids (contact-insecticidal action) of the type *Doralis fabae*. Heavily infested bean plants (*Vicia faba*) have been sprayed drip wet with solutions as prepared above. The effect has been determined by evaluation after 24 hours by counting the dead pests either on the surface of the soil or still remaining on the plants. The following results have been obtained:

| Compound | Aqueous concentration (in percent active ingredient/water) | Killing rate (in percent) |
|---|---|---|
| (I) | 0.001 | 80 |
| (II) | 0.01 | 100 |

(b) Against spider mites (contact-insecticidal action). Bean plants (*Phaseolus vulgaris*) of about 15 inches height are sprayed drip wet with solutions prepared as indicated above. The bean plants have been infested heavily with the two-spotted spider (species *Tetranychus telarius*). Evaluation has been carried out after 24 hours, 48 hours, 8 days. The following results have been obtained:

| Compound | Aqueous concentration (in percent active ingredient/water) | Killing rate (in percent) |
|---|---|---|
| (I) | 0.01 | 100 |
| (II) | 0.001 | 100 |
| (III) | 0.001 | 100 |

The following examples are given for the purpose of illustrating the invention, without however, limiting it thereto.

Example 1

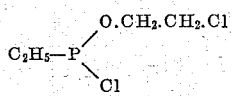

(a) 131 g. (1 mol) of ethyl-phosphonous acid dichloride are dissolved in 1000 cc. of benzene. A mixture of 81 g. of glycol-chlorohydrin and 80 g. of pyridine is added dropwise to this solution at 0 to 10° C. while stirring, the reaction mixture is subsequently stirred for one hour and the resultant pyridinium hydrochloride then filtered off with suction. After evaporating the benzene from the filtrate, 150 g. (86% of the theoretical amount) of ethyl-phosphonous acid-O-β-chloroethyl ester chloride are obtained in form of a colourless water-insoluble compound.

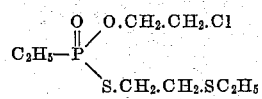

(b) To a solution of 50 g. of pyridine and 61 g. of β-ethyl-mercapto-ethyl mercaptan in 400 cc. of benzene there are added dropwise at 30 to 40° C. while stirring 88 g. (0.5 mol) of ethyl-phosphonous acid-O-β-chloroethyl ester chloride, the mixture is then further stirred at 30–35° C. for one hour and subsequently treated with 50 g. of 37% hydrogen peroxide while stirring is continued. The reaction mixture is then afterstirred for a further hour, washed with a 3% sodium bicarbonate solution, dried over sodium sulphate and finally fractionated by distillation. In this way 44 g. (32% of the theoretical amount) of ethyl-thiolphosphonic-acid-O-β-chloroethyl-S-(β-ethyl-mercapto-ethyl) ester of B.P. 106° C./0.01 mm. Hg are obtained.

The mean toxicity of this compound on rats per os is 3 mg. per kg. of animal. Spider mites are destroyed to 100% with 0.01% solutions of the ester, whilst 0.001% solutions destroy aphids to 80%.

By exactly the same way there may be obtained the following compounds:

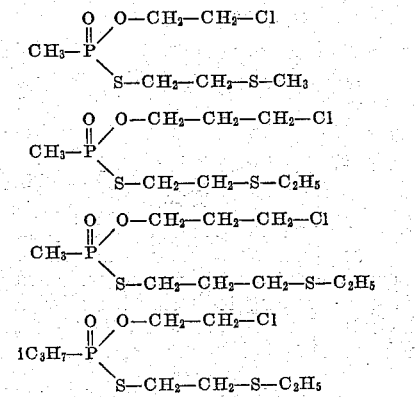

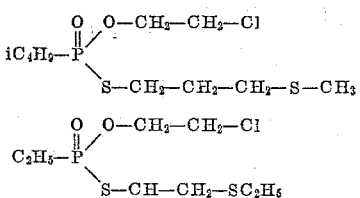

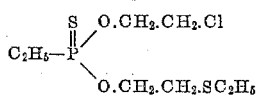

*Example 2*

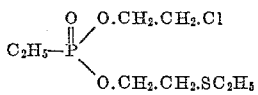

50 g. of pyridine and 53 g. of β-ethylmercapto ethanol are dissolved in 400 cc. of benzene, 88 g. (0.5 mol) of ethyl-phosphonous acid-O-β-chloroethyl ester chloride are added dropwise to this solution at 30–40° C. while stirring, the mixture is subsequently further stirred for one hour and then treated with 16 g. of finely powdered sulphur, whereupon the temperature of the reaction mixture spontaneously rises to 50° C. To complete the reaction, the mixture is further heated to 75 to 80° C. for one hour and then worked up as described in Example 1(b). 81 g. (59% of the theoretical amount) of ethyl-thionophosphonic acid-O-β-chloroethyl-O-(β-ethylmercapto-ethyl) ester of B.P. 98° C./0.01 mm. Hg are thus obtained.

On rats per os the compound shows a mean toxicity ($DL_{50}$) of 5 mg. per kg. of animal. Spider mites are destroyed to 100% by 0.001% solutions and aphids by 0.01% solutions of the ester. The compound has moreover an ovicidal activity and shows good systemic properties.

In the same manner as described above the following compounds may be obtained:

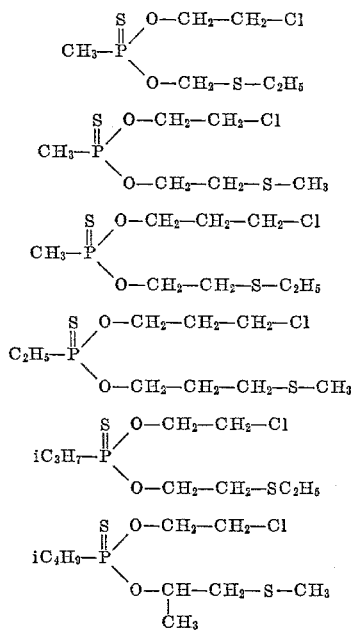

*Example 3*

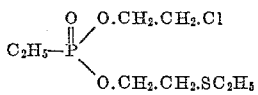

To a solution of 50 g. of pyridine and 53 g. of β-ethyl-mercapto-ethanol in 400 cc. of benzene there is added dropwise at 30° C. while conducting nitrogen through the reaction mixture 88 g. (0.5 mol) of ethyl-phosphonous acid-β-chlorethyl ester chloride, the mixture is subsequently heated to 40° C. for one hour and then treated with 50 g. of 37% hydrogen peroxide while stirring is continued. After termination of the addition, the mixture is heated to 35° C. for a further hour and then worked up as described in Example 1(b). In this way, 39 g. (30% of the theoretical amount) of ethyl-phosphonic acid-O-β-chloroethyl-O-(β-ethylmercapto-ethyl) ester of B.P. 96° C./0.01 mm. Hg are obtained in form of a water-soluble oil.

Administered per os the mean toxicity of the compound is 375 mg. per kg. of rat.

By the same way there may be produced the following compounds:

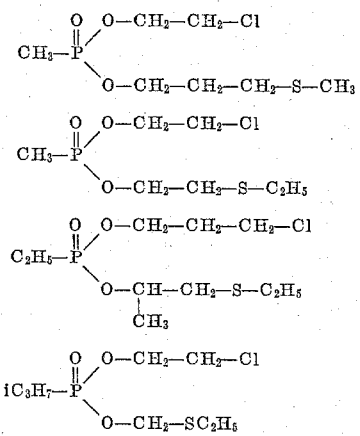

*Example 4*

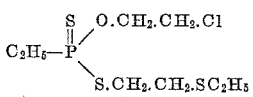

50 g. of pyridine and 61 g. of β-ethylmercapto ethylmercaptan are dissolved in 400 cc. of benzene. To the resultant solution, 88 g. (0.5 mol) of ethyl-phosphonous acid-β-chlorethyl ester chloride are added at 40° C. while stirring, the mixture is heated at 40° C. for one hour and 16 g. of finely powdered sulphur are then added. Subsequently the reaction mixture is heated to 80° C. for a further hour and then worked up as described in Example 1(b). 82 g. (56% of the theoretical amount) of ethyl-thionothiolphosphonic acid-O-β-chloroethyl - S - (β-ethyl-mercapto-ethyl) ester of B.P. 103° C./0.01 mm. Hg are thus obtained. Mean toxicity of the compound on rats per os: 5 mg. per kg. of animal. Spider mites are destroyed to 100% by 0.001% solutions, eating insects (caterpillars) by 0.1% solutions. The compound has moreover an ovicidal activity and also shows systemic action.

Under the same conditions there may be obtained the compounds of the following formulae:

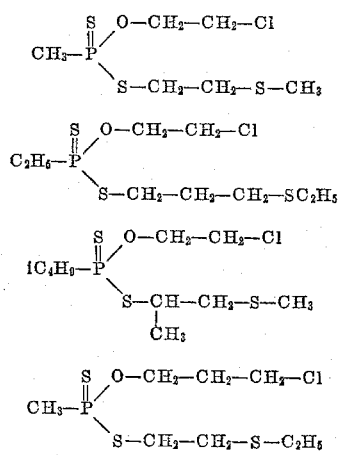

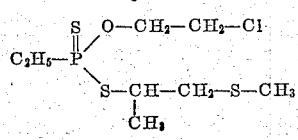

I claim:
1. A compound of the formula

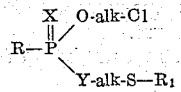

wherein R and $R_1$ each stand for lower alkyl having up to 4 carbon atoms; alk stands for lower alkylene having up to 4 carbon atoms; and X and Y each stand for a member selected from the group consisting of oxygen and sulfur, with the proviso that when Y stands for oxygen, X stands for oxygen.

2. A compound of claim 1 wherein X and Y are each oxygen.
3. A compound of claim 1 wherein X and Y are each sulfur.
4. A compound of claim 1 wherein X is oxygen and Y is sulfur.
5. The compound of the following formula

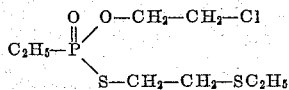

6. The compound of the following formula

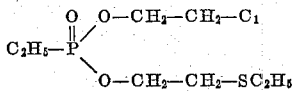

7. The compound of the following formula

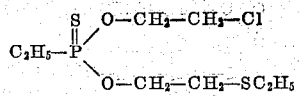

8. The compound of the following formula

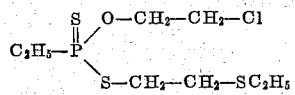

References Cited by the Examiner
UNITED STATES PATENTS

| | | | |
|---|---|---|---|
| 2,881,201 | 4/59 | Schrader | 260—461.110 |
| 2,895,983 | 7/59 | Asseff | 260—461.110 |
| 2,907,787 | 10/59 | Hoffmann et al. | 260—461.110 |
| 2,957,019 | 10/60 | McCall et al. | 260—461.112 |
| 2,983,748 | 5/61 | Schlor | 260—461.110 |
| 3,020,305 | 2/62 | Chupp | 260—461.112 |

FOREIGN PATENTS 218,030  11/61  Austria.

OTHER REFERENCES

Kabachnik et al.: "Chem. Abst.," vol. 54, col. 8594 (1960).

Aaron et al.: "J. Am. Chem. Soc.," vol. 80, pp. 456–458 (1958).

Volkova: "Vaprosy Med. Khinsee," vol. 8, #3, 1961, pp. 250–259.

CHARLES B. PARKER, *Primary Examiner.*

LEWIS GOTTS, IRVING MARCUS, *Examiners.*